United States Patent
Krishnamurthy

(10) Patent No.: US 8,943,200 B2
(45) Date of Patent: Jan. 27, 2015

(54) METHOD AND APPARATUS FOR REDUCING UNWANTED TRAFFIC BETWEEN PEER NETWORKS

(75) Inventor: Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 578 days.

(21) Appl. No.: 12/186,473

(22) Filed: Aug. 5, 2008

(65) Prior Publication Data

US 2010/0036947 A1    Feb. 11, 2010

(51) Int. Cl.
*G06F 15/173* (2006.01)
*G01R 31/08* (2006.01)
*H04J 3/16* (2006.01)
*H04M 3/00* (2006.01)
*H04L 12/58* (2006.01)
*H04L 29/06* (2006.01)

(52) U.S. Cl.
CPC .............. *H04L 12/585* (2013.01); *H04L 51/12* (2013.01); *H04L 63/0236* (2013.01); *H04L 63/1458* (2013.01); *H04L 2463/144* (2013.01)
USPC ............ 709/225; 370/230; 370/466; 455/419

(58) Field of Classification Search
CPC ....... H04L 45/52; H04L 63/16; H04L 63/102; H04L 49/90
USPC ................... 713/201; 370/90, 252, 331, 250; 709/225
See application file for complete search history.

(56) References Cited

U.S. PATENT DOCUMENTS

| | | | | |
|---|---|---|---|---|
| 5,675,741 A * | 10/1997 | Aggarwal et al. | ............. | 709/242 |
| 6,052,709 A * | 4/2000 | Paul | ............. | 709/202 |
| 6,763,007 B1 * | 7/2004 | La Porta et al. | ............. | 370/331 |
| 6,940,862 B2 * | 9/2005 | Goudreau | ............. | 370/395.52 |
| 6,947,428 B1 * | 9/2005 | Andersson et al. | ........ | 370/395.5 |
| 7,016,973 B1 * | 3/2006 | Sibal et al. | ............. | 709/238 |
| 7,154,416 B1 * | 12/2006 | Savage | ............. | 341/51 |
| 7,215,637 B1 * | 5/2007 | Ferguson et al. | ............. | 370/230.1 |
| 7,523,485 B1 * | 4/2009 | Kwan | ............. | 726/2 |
| 7,676,566 B2 * | 3/2010 | Lund et al. | ............. | 709/223 |
| 7,693,146 B2 * | 4/2010 | Subramanian | ............. | 370/390 |
| 2001/0025377 A1 * | 9/2001 | Hinderks | ............. | 725/109 |
| 2002/0021675 A1 * | 2/2002 | Feldmann | ............. | 370/254 |
| 2002/0023045 A1 * | 2/2002 | Feilbogen et al. | ............. | 705/37 |
| 2003/0021244 A1 * | 1/2003 | Anderson | ............. | 370/329 |
| 2004/0095893 A1 * | 5/2004 | Goringe et al. | ............. | 370/252 |
| 2004/0148520 A1 * | 7/2004 | Talpade et al. | ............. | 713/201 |
| 2004/0213224 A1 * | 10/2004 | Goudreau | ............. | 370/389 |
| 2005/0102410 A1 * | 5/2005 | Tuomi | ............. | 709/229 |
| 2006/0047769 A1 * | 3/2006 | Davis et al. | ............. | 709/207 |
| 2006/0048142 A1 * | 3/2006 | Roese et al. | ............. | 717/176 |
| 2006/0185014 A1 * | 8/2006 | Spatscheck et al. | ............. | 726/23 |
| 2006/0193247 A1 * | 8/2006 | Naseh et al. | ............. | 370/216 |
| 2006/0256729 A1 * | 11/2006 | Chen et al. | ............. | 370/250 |
| 2007/0033650 A1 * | 2/2007 | Grosse et al. | ............. | 726/22 |
| 2007/0064697 A1 * | 3/2007 | Nesbitt et al. | ............. | 370/392 |
| 2007/0104197 A1 * | 5/2007 | King | ............. | 370/392 |

(Continued)

*Primary Examiner* — Arvin Eskandarnia
*Assistant Examiner* — Margishi Desai

(57) ABSTRACT

A method and apparatus for enabling peer networks to reduce the exchange of unwanted traffic are disclosed. For example, the method receives at least one of: a source Internet Protocol (IP) address or a source IP address prefix that has been identified as a source of the unwanted traffic, by an originating peer network from a terminating peer network. The method then blocks the unwanted traffic destined to the terminating peer network by the originating peer network.

3 Claims, 4 Drawing Sheets

(56) References Cited

U.S. PATENT DOCUMENTS

| | | | |
|---|---|---|---|
| 2007/0159979 A1* | 7/2007 | Butler et al. | 370/244 |
| 2008/0004049 A1* | 1/2008 | Yigang et al. | 455/466 |
| 2008/0028467 A1* | 1/2008 | Kommareddy et al. | 726/23 |
| 2008/0082658 A1* | 4/2008 | Hsu et al. | 709/224 |
| 2008/0141332 A1* | 6/2008 | Treinen | 726/1 |
| 2008/0256622 A1* | 10/2008 | Neystadt et al. | 726/14 |
| 2008/0287111 A1* | 11/2008 | Zabawskyj et al. | 455/414.1 |
| 2009/0006841 A1* | 1/2009 | Ormazabal et al. | 713/152 |
| 2009/0013041 A1* | 1/2009 | Farmer et al. | 709/204 |
| 2009/0154373 A1* | 6/2009 | Ye et al. | 370/253 |
| 2010/0040059 A1* | 2/2010 | Albert Hu | 370/392 |
| 2010/0281541 A1* | 11/2010 | Stolfo et al. | 726/23 |

* cited by examiner

A
METHOD AND APPARATUS FOR REDUCING UNWANTED TRAFFIC BETWEEN PEER NETWORKS

The present invention relates generally to communication networks and, more particularly, to a method and apparatus for reducing unwanted traffic between internet peer networks, e.g., Internet Protocol (IP) networks.

BACKGROUND OF THE INVENTION

Internet Service Provider (ISP) routinely peers with other ISPs to exchange traffic at specific locations to take advantage of communication patterns between peering ISPs. For instance, an ISP peers with another ISP in order to have direct communication and to exchange necessary traffic quickly. Additional advantages of peering include avoiding routing customer traffic through additional hops as well as reducing costs by agreeing to a symmetrical amount of data exchange, etc. Peering is voluntary interconnection of administratively separate Internet networks for the purpose of exchanging traffic between the customers of each network.

Large ISPs routinely filter incoming traffic that is viewed as unwanted. This filtering of incoming traffic is accomplished at considerable cost despite there is a significant upside ensuring that internal web sites stay up or data centers are not brought down, etc. Examples of unwanted traffic include spam emails, hacker attacks, probes, scans, etc. Such filtering is performed at firewalls using rules, access control lists, low-level traffic filters, and application-level software. ISPs also periodically examine outgoing traffic. In some cases, such examination is performed to prevent access to certain remote destinations. Examples could be blocked websites, known spyware or adware sites, or blacklisted destinations or Internet Protocol (IP) address prefixes. However, typically there is no effort to block outgoing traffic by ISPs.

SUMMARY OF THE INVENTION

In one embodiment, the present invention provides a method and apparatus for enabling peer networks to reduce the exchange of unwanted traffic. For example, the method receives at least one of: a source Internet Protocol (IP) address or a source IP address prefix that has been identified as a source of the unwanted traffic, by an originating peer network from a terminating peer network. The method then blocks the unwanted traffic destined to the terminating peer network by the originating peer network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
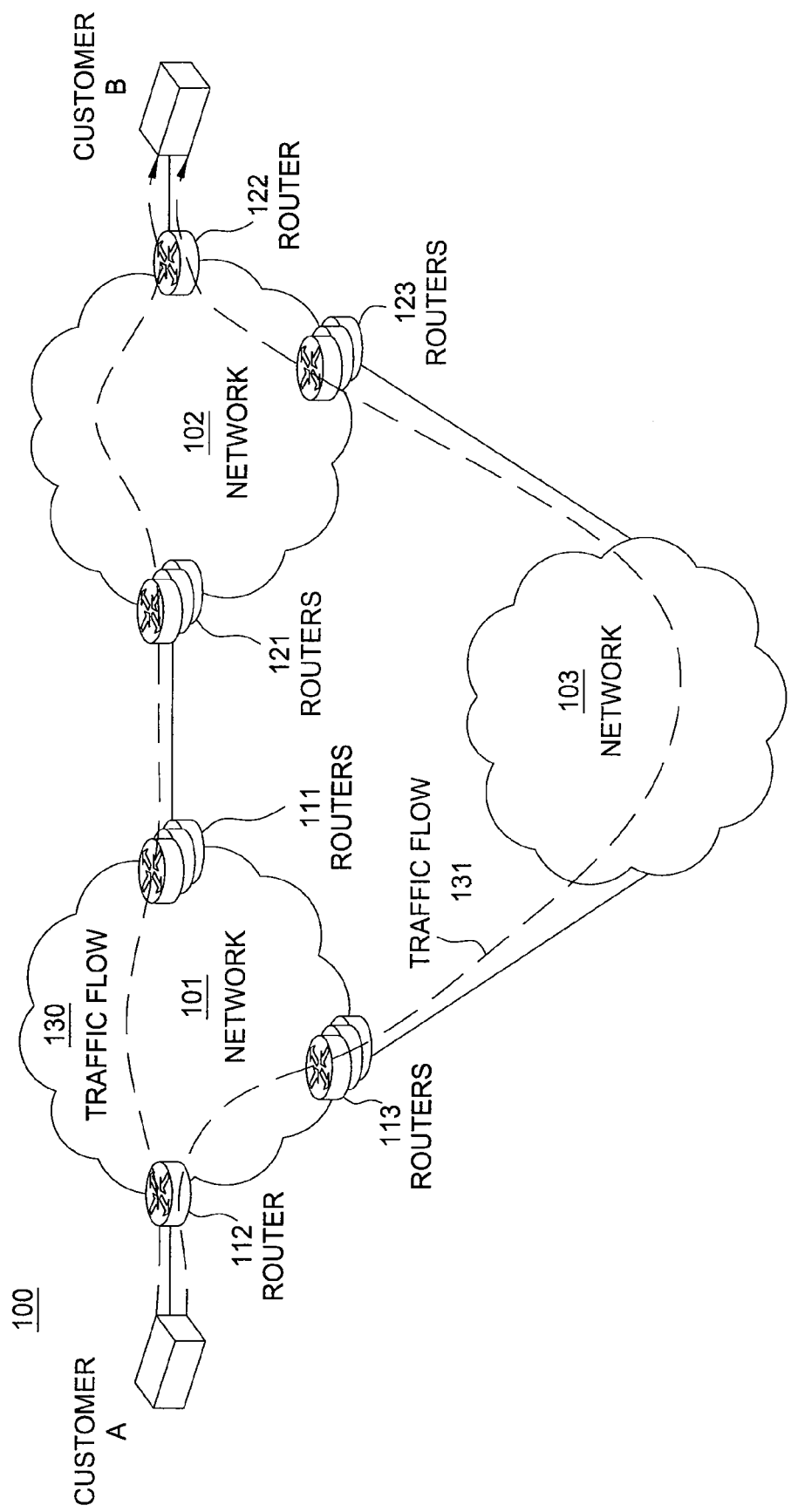
FIG. 1 illustrates an exemplary Voice over Internet Protocol (VoIP) network related to the present invention.

As discussed above, an Internet Service Provider (ISP) routinely peers with other ISPs to exchange traffic at specific locations to take advantage of communication patterns between peering ISPs. Large ISPs routinely filter incoming traffic that is viewed as unwanted. Examples of unwanted traffic include, but are not limited to, spam emails, phishing, hacker attacks, probes, and scans etc. Phishing is an attempt to criminally and fraudulently acquire sensitive information, such as usernames, passwords and credit card details, by masquerading as a trustworthy entity in an electronic communication. Spamming is the abuse of electronic messaging systems to indiscriminately send unsolicited bulk messages. Scanning and probing refer to searches performed by a remote host computer to another network host computer for open network ports.

Such filtering can be implemented at firewalls using rules, access control lists, low-level traffic filters, and application-level software. In one embodiment, ISPs may periodically examine outgoing traffic. In some cases, such examination is performed to prevent access to certain remote destinations. Examples could be blocked websites, known spyware or adware sites, or blacklisted destinations or Internet Protocol (IP) address prefixes. Spyware is computer software that is installed surreptitiously on a personal computer to intercept or take partial control over the user's interaction with the computer, without the user's informed consent. Adware is software which automatically plays, displays, or downloads advertising material to a computer after the software is installed on it or while the application is being used.

However, although ISPs have the ability to deduce traffic that is suspect or unwanted, ISPs do not block outgoing traffic to their peers even if they know or presume that the traffic is suspect or unwanted. Typically, there has been no effort to block outgoing traffic by ISPs.

To address this criticality, the present invention enables peer networks to reduce the exchange of unwanted traffic. In one embodiment, peering ISPs notify each other about suspected source IP addresses or prefixes that are responsible for a significant amount of unwanted traffic (such as spam, phishing, scanning, probing, and the like). The two peers then filter outgoing traffic from the suspected source addresses. In other words, unwanted traffic is blocked at the earliest possible time and location. The peering ISPs thus reduce cost for filtering such incoming traffic. Bi-directional behavior between trusted peers reduces cost for both peers and frees up filtering resources.

The present invention is to extend the peering model to reduce unwanted traffic before such outgoing unwanted traffic is forwarded to another peer ISP. Since there is already a certain degree of trust and knowledge sharing involved in existing peering relationships (where large ISPs agree to exchange roughly symmetrical data at specific geographic locations over specific links), the present invention extends the same degree of trust for unwanted traffic. Such outgoing traffic filtering of unwanted traffic can be beneficial to the network providers of those peer networks.

To better understand the present invention, FIG. 1 illustrates an illustrative peer network 100 related to the present invention. In this example, exemplary peer networks are packet networks, e.g., Internet Protocol (IP) networks interconnected to each other using the Border Gateway Protocol (BGP). The Border Gateway Protocol (BGP) is the core routing protocol of the Internet. It should be noted that peer network 100 is only illustrative. As such, the present invention is not limited to a particular type of network or a particular type of communications or routing protocol used by the peering networks.

In FIG. 1, ISP A operates network 101 and ISP B operates network 102. Traffic flow 130 illustrates an exemplary traffic flow originating from customer A supported by network 101 being sent to customer B supported by network 102. Network 101 peers with network 102 via one or more peering routers 111 and one or more peering routers 121. In one embodiment, peering routers may use BGP routing protocol to peer with each other. Routers 111 represents one or more routers at one or more locations in network 101 and routers 121 represents one or more routers at one or more locations in network 102.

Currently, existing peer networks typically filters unwanted incoming traffic before delivering it to the destination. For instance, using traffic flow 130 for illustrations, unwanted traffic sent by customer A to customer B may be filtered by egress router 122, or earlier by another network element in network 102. Therefore, incoming unwanted traffic from customer B's perspective is filtered by network 102.

The present invention enables unwanted traffic to be blocked or filtered even earlier in its traffic flow. For example, network 101 that blocks a list of source addresses or source address prefixes, such as the source IP address or the source address prefix of customer A, from sending traffic to network 102 can drop such traffic earlier at source router 112 or peering routers 111, thereby reducing its internal traffic load or congestion. Broadly defined, a source router is a router at the edge of an internet peer network that provides interconnection to the source of incoming traffic. The decision to block traffic at a source router or a peering router is a configurable parameter set by the network operator of network 101, e.g., ISP A in this case, and is purely an internal decision of the network operator. Network 102 clearly benefits by not having to waste resources filtering such unwanted traffic at its egress links or end-host machines, such as egress router 122. Similarly, network 102 will block a list of its source IP addresses from sending traffic to network 101 in return.

The list of IP source addresses can be gathered independently by each peer network internally using reasonable criteria. For example, using FIG. 1 as an example, network 102 may notice that a significant amount of unwanted traffic is coming from a specific IP address prefix in network 101. The identified IP address prefix is then added to a list, a blacklist, of source IP addresses to be block. In the present invention, network 102 will notify network 101 about this suspected IP address prefix generating the identified unwanted traffic and the traffic will be blocked by network 101 at source router 112 or peering routers 111 and will never show up at the ingress points, such as peering routers 121, of network 102. Network 101 also has the benefit that if the IP addresses in the suspected IP address prefix includes zombies (machines that have been taken over for purposes of sending unwanted traffic), it can notify the user, such as customer A, or take steps to shut it down, by blocking it at source router 112. A machine that has been taken over can cause considerable problems even within network 101. A zombie machine, often abbreviated as zombie, is a computer attached to the Internet that has been compromised by a hacker or a computer virus and is used to perform malicious tasks of one sort or another under remote direction. Thus, network 101 reduces congestion within itself and reduces other problems caused by a zombie.

In another instance, again using FIG. 1 for illustrations, traffic flow between customer A and customer B can take place over a third party transit network. In FIG. 1, traffic flow 131 indicates the traffic flow between customer A of network 101 and customer B of network 102 using a third party transit network 103 operated by ISP C that is independent of ISP A that operates network 101 and ISP B that operates network 102.

Traffic flow 131 illustrates an exemplary traffic flow originating from customer A supported by network 101 destined to customer B supported by network 102 via network 103. Network 101 peers with network 103 via one or more peering routers 113. In turn, network 102 peers with network 103 via one or more peering routers 123. Again, the peering routers may use BGP routing protocol to peer with each other. Routers 113 represent one or more routers at one or more locations in network 101 and routes 123 represent one or more routers at one or more locations in network 102.

The present invention enables unwanted traffic to be blocked or filtered early in its traffic flow. For example, network 101 that blocks a list of source addresses or source address prefixes, such as the source IP address or the source IP address prefix of customer A, from sending traffic destined to network 102 via network 103 can drop such traffic earlier at source router 112 or transit routers 113 reducing its internal traffic load or congestion. The decision to block traffic at a source router or a peering router is a configurable parameter set by the network operator of network 101, e.g., ISP A in this case, and is purely an internal decision of the network operator. Network 102 clearly benefits by not having to waste resources filtering such unwanted traffic at its egress links or end-host machines, such as egress router 122. Similarly, network 102 will block a list of its source IP addresses from sending traffic to network 101 in return. Furthermore, third party transmit network 103 will benefit as well.

The list of IP source addresses can be gathered independently by each peer network internally using reasonable criteria. Using FIG. 1 as an example, network 102 may notice that a significant amount of scanning or probe traffic is coming from a specific IP address prefix in network 101. The identified IP address prefix is then added to a list, a blacklist, of source IP addresses to be block. In the present invention, network 102 will notify network 101 about this suspected IP address prefix generating the identified unwanted traffic and the traffic will be blocked by network 101 at source router 112 or transit routers 113 and will never show up at the ingress points, such as transit routers 123, of network 102. It should be noted that there may be peering routers (e.g., for routers 113, and 123) in network 103 that are not shown. Network 101 also has the benefit that if the IP addresses in the suspected IP address prefix include zombies, it can notify the user, such as customer A, or take steps to shut it down, by blocking it at source router 112. A machine that has been taken over can cause considerable problems even within network 101. Thus, network 101 reduces congestion within itself and reduces other problems caused by a zombie.

The present invention is rooted in the economic value for the peers and expanding this peering model will allow a steadily increasing set of co-operating peer networks to reduce unwanted traffic among them. Eventually, the only unwanted traffic would be from non-peering networks or ISPs and the existing incoming filtering resources can be targeted towards traffic emanating from such networks or ISPs.

In addition to lowering filtering costs for ISPs, the present invention allows reallocation of expensive filtering resources to places where these resources can be better utilized. For example, the existing trust between peers will help reduce concerns about untrustworthy ISPs that may not be genuinely co-operative. Furthermore, it is relatively straightforward to generate traffic from a peering network (by getting access to a host in that network) to see if the traffic is actually being blocked.

There are several major benefits of the present invention:
reduce filtering costs;
free up resources that can be better used to deal with other unwanted traffic; and
reduce congestion inside a network by blocking unwanted traffic at the source.

By growing the network of co-operating ISPs that peer with each other to reduce unwanted traffic, ISPs can also improve their perception in the external community.

Figure 2:
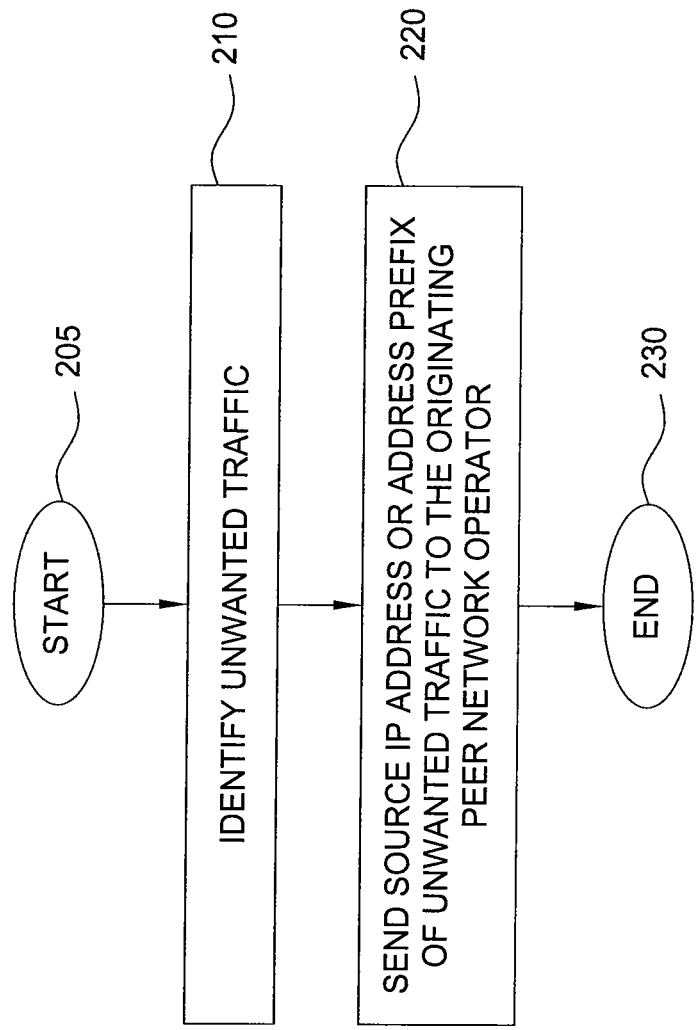
FIG. 2 illustrates a flowchart of a method for identifying unwanted incoming traffic by a terminating peer network of the present invention.

FIG. 2 illustrates a flowchart of a method for identifying unwanted incoming traffic by a terminating peer network of the present invention. For example, method 200 can be implemented by a router or a network element, e.g., an application server, within a network. Method 200 starts in step 205 and proceeds to step 210.

In step 210, the method identifies unwanted incoming traffic destined to the terminating peer network. The unwanted incoming traffic can be monitored and identified at the egress point of the terminating peer network before it is delivered to the destination.

In step 220, the method sends a list of the source IP addresses or address prefixes of the identified unwanted incoming traffic to the network operator of the originating peer network from which the unwanted traffic has been sent. The method ends in step 230.

Figure 3:
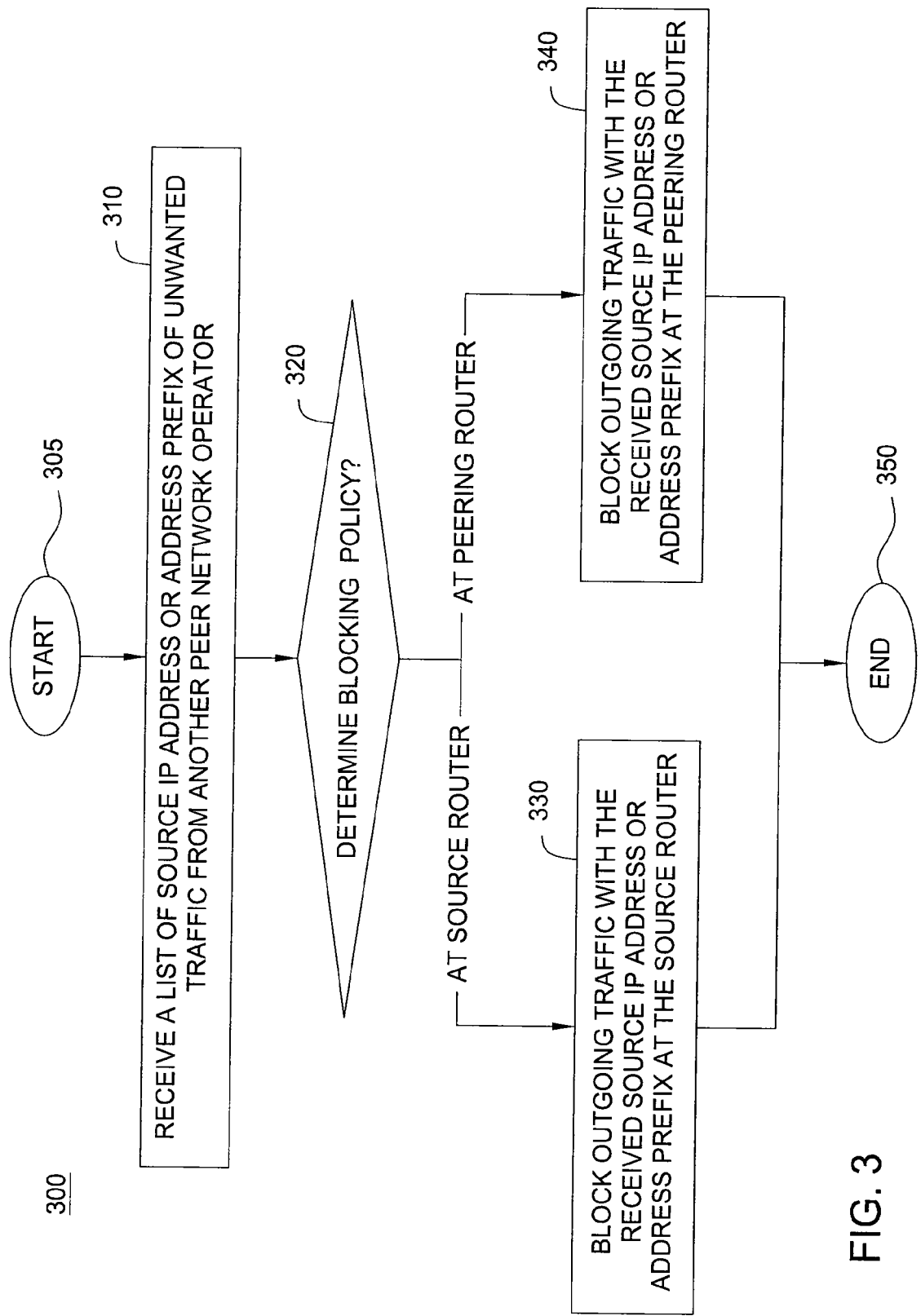
FIG. 3 illustrates a flowchart of a method for blocking unwanted outgoing traffic by an originating peer network of the present invention.

FIG. 3 illustrates a flowchart of a method for blocking unwanted outgoing traffic by an originating peer network of the present invention. For example, method 300 can be implemented by a router or a network element, e.g., an application server, within a network. Method 300 starts in step 305 and proceeds to step 310.

In step 310, the method receives a list of source IP addresses or address prefixes of unwanted traffic from the operator of a terminating peer network. For example, the list is received by the operator of an originating peer network.

In step 320, the method determines the blocking policy of the network operator. The blocking policy is a configurable parameter set by the network operator. If the blocking policy is set to block unwanted traffic at a source router, the method proceeds to step 330. In step 330, the method blocks the unwanted traffic using the received list of source IP addresses or address prefixes at the source router of the originating peering network. For example, if a zombie machine is detected by the originating internet peer network operator, the network operator can decide to block unwanted traffic from the zombie machine at a source router.

If the blocking policy is set to block unwanted traffic at a peering router, the method proceeds to step 340. In step 340, the method blocks the unwanted traffic using the received list of source IP addresses or address prefixes at the egress peering router of the originating peering network. The method ends in step 350.

It should be noted that although not specifically specified, one or more steps of methods 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2 and 3 that recite a determining operation or involve a decision, do not necessarily require that both branches of the determining operation be practiced. In other words, one of the branches of the determining operation can be deemed as an optional step.

Figure 4:
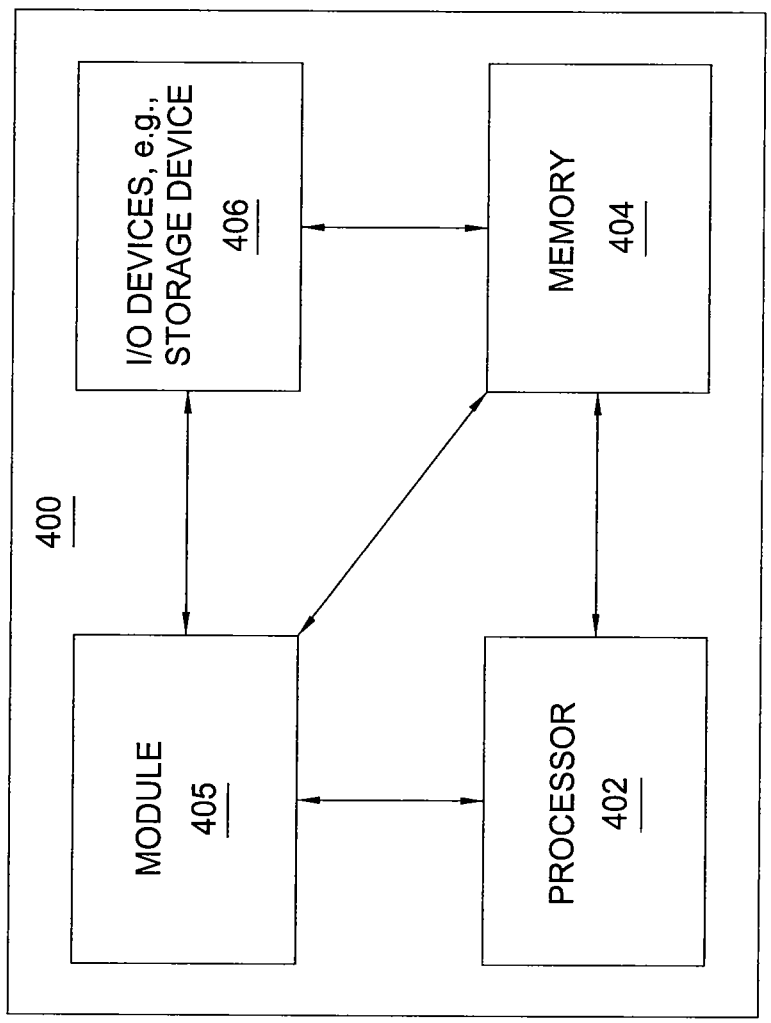
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for reducing unwanted traffic between internet peer networks, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for reducing unwanted traffic between internet peer networks can be loaded into memory 404 and executed by processor 402 to implement the functions as discussed above. As such, the present process 405 for reducing unwanted traffic between internet peer networks (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for blocking unwanted traffic between an originating peer network and a terminating peer network, comprising:

receiving, via a processor of an egress peering router of the originating peer network, source Internet protocol address information that has been identified as a source of the unwanted traffic destined to the terminating peer network, wherein the source Internet protocol address information is received from the terminating peer network, wherein the source internet protocol address information indicates that the source is generating the unwanted traffic, wherein the unwanted traffic comprises a probing traffic, wherein the originating peer network is operated by a first service provider and the terminating peer network is operated by a second service provider, wherein the egress peering router comprises a peering router in a location in the originating peer network; and blocking, via the processor, subsequently the unwanted traffic destined to the terminating peer network by the originating peer network using the source internet protocol address information, wherein the blocking comprises:

blocking the unwanted traffic destined to the terminating peer network at the egress peering router in the originating peer network, wherein the egress peering router comprises a peering router that provides a direct interconnection between the originating peer network and the terminating peer network, wherein the blocking is performed in accordance with a configurable parameter set by the first service provider.

2. A non-transitory computer-readable medium storing a plurality of instructions which, when executed by a processor of an egress peering router of an originating peer network, cause the processor to perform operations for blocking unwanted traffic between the originating peer network and a terminating peer network, the operations comprising:
  receiving source internet protocol address information that has been identified as a source of the unwanted traffic destined to the terminating peer network, wherein the source internet protocol address information is received from the terminating peer network, wherein the source internet protocol address information indicates that the source is generating the unwanted traffic, wherein the unwanted traffic comprises a probing traffic, wherein the originating peer network is operated by a first service provider and the terminating peer network is operated by a second service provider, wherein the egress peering router comprises a peering router in a location in the originating peer network; and
  blocking subsequently the unwanted traffic destined to the terminating peer network by the originating peer network using the source internet protocol address information, wherein the blocking comprises:
    blocking the unwanted traffic destined to the terminating peer network at the egress peering router in the originating peer network, wherein the egress peering router comprises a peering router that provides a direct interconnection between the originating peer network and the terminating peer network, wherein the blocking is performed in accordance with a configurable parameter set by the first service provider.

3. An apparatus for blocking unwanted traffic between an originating peer network and a terminating peer network, comprising:
  a processor of an egress peering router of the originating peer network; and
  a computer-readable medium storing a plurality of instructions which, when executed by the processor, cause the processor to perform operations, the operations comprising:
    receiving source internet protocol address information that has been identified as a source of the unwanted traffic destined to the terminating peer network, wherein the source internet protocol address information is received from the terminating peer network, wherein the source internet protocol address information indicates that the source is generating the unwanted traffic, wherein the unwanted traffic comprises a probing traffic, wherein the originating peer network is operated by a first service provider and the terminating peer network is operated by a second service provider, wherein the egress peering router comprises a peering router in a location in the originating peer network; and
    blocking subsequently the unwanted traffic destined to the terminating peer network by the originating peer network using the source internet protocol address information, wherein the blocking comprises:
      blocking the unwanted traffic destined to the terminating peer network at the egress peering router in the originating peer network, wherein the egress peering router comprises a peering router that provides a direct interconnection between the originating peer network and the terminating peer network, wherein the blocking is performed in accordance with a configurable parameter set by the first service provider.

* * * * *